US010723352B2

(12) United States Patent
Schein

(10) Patent No.: US 10,723,352 B2
(45) Date of Patent: Jul. 28, 2020

(54) U-TURN ASSISTANCE

(71) Applicant: Ford Global Technologies, LLC, Dearborn, MI (US)

(72) Inventor: Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/060,460

(22) PCT Filed: Dec. 9, 2015

(86) PCT No.: PCT/US2015/064746
§ 371 (c)(1),
(2) Date: Jun. 8, 2018

(87) PCT Pub. No.: WO2017/099753
PCT Pub. Date: Jun. 15, 2017

(65) Prior Publication Data
US 2018/0362035 A1    Dec. 20, 2018

(51) Int. Cl.
*B60W 30/095*    (2012.01)
*B60W 50/08*     (2020.01)
*B60W 40/00*     (2006.01)
*G01C 21/34*     (2006.01)
(Continued)

(52) U.S. Cl.
CPC ........ *B60W 30/0953* (2013.01); *B60W 40/00* (2013.01); *B60W 40/10* (2013.01); *B60W 50/08* (2013.01); *B60W 50/14* (2013.01); *G01C 21/3453* (2013.01); *G01C 21/3461* (2013.01); *B60W 2300/14* (2013.01)

(58) Field of Classification Search
CPC .. B60W 30/0953; B60W 50/14; B60W 40/10; B60W 2300/14; G01C 21/3453; G01C 21/3461
See application file for complete search history.

(56) References Cited

U.S. PATENT DOCUMENTS 7,003,443 B2   2/2006  Ford et al.
7,366,595 B1   4/2008  Shimizu et al.
7,598,889 B2   10/2009  Maeda et al.
(Continued)

FOREIGN PATENT DOCUMENTS

BE   1015750 A3    8/2005
JP   2006213162 A  8/2006
(Continued)

OTHER PUBLICATIONS

International Search Report re PCT/US2015/064746 dated Feb. 23, 2016.

*Primary Examiner* — Atul Trivedi
(74) *Attorney, Agent, or Firm* — Gregory P. Brown; Brooks Kushman P.C.

(57) ABSTRACT

Methods, devices and apparatuses pertaining to U-turn assistance. The method may include receiving, by a computing device, vehicle information associated with a vehicle from a plurality of sensors that are placed on a plurality of locations of the vehicle and obtaining a length and a width of the vehicle based on the received vehicle information. The computing device may calculate a turning radius of the vehicle, and provide a recommendation for routing the vehicle based at least in part on the turning radius.

18 Claims, 3 Drawing Sheets

(51) Int. Cl.
   *B60W 40/10* (2012.01)
   *B60W 50/14* (2020.01)

(56) References Cited

U.S. PATENT DOCUMENTS

| | | | |
|---|---|---|---|
| 8,010,249 | B2 | 8/2011 | Liebl et al. |
| 8,610,595 | B1 | 12/2013 | Aleteeby |
| 8,676,500 | B1 | 3/2014 | Walsh |
| 9,056,616 | B1 | 6/2015 | Fields et al. |
| 10,317,899 | B2 * | 6/2019 | Liu .................. G07C 5/0816 |
| 2003/0016143 | A1 | 1/2003 | Ghazarian |
| 2005/0143889 | A1 | 6/2005 | Isaji et al. |
| 2011/0125457 | A1 | 5/2011 | Lee et al. |
| 2011/0153199 | A1 | 6/2011 | Morimoto et al. |
| 2012/0188374 | A1 | 7/2012 | Taner |
| 2012/0271522 | A1 * | 10/2012 | Rupp .................... B62D 13/06 701/70 |
| 2013/0135472 | A1 | 5/2013 | Wu et al. |
| 2013/0158826 | A1 | 6/2013 | Cusi |
| 2013/0246301 | A1 | 9/2013 | Radhakrishnan et al. |
| 2014/0188346 | A1 * | 7/2014 | Lavoie .................. B62D 13/06 701/42 |
| 2014/0303849 | A1 * | 10/2014 | Hafner .................. B60D 1/245 701/42 |
| 2015/0134226 | A1 * | 5/2015 | Palmer ................. B60W 40/10 701/101 |
| 2015/0177010 | A1 * | 6/2015 | Abramson ............. G01C 21/34 701/400 |
| 2015/0241231 | A1 * | 8/2015 | Abramson ......... G01C 21/3697 701/534 |
| 2016/0311442 | A1 * | 10/2016 | Shin ...................... B60W 40/10 |
| 2017/0018186 | A1 * | 1/2017 | Probert ................... G08G 1/163 |
| 2018/0066957 | A1 * | 3/2018 | Stroila ................. G08G 1/0112 |
| 2018/0370532 | A1 * | 12/2018 | Schein ............ B60W 30/18009 |
| 2019/0009778 | A1 * | 1/2019 | Schein ................ B60W 30/095 |
| 2019/0049258 | A1 * | 2/2019 | Schein ............... G01C 21/3461 |

FOREIGN PATENT DOCUMENTS

| | | |
|---|---|---|
| JP | 2011077898 A | 4/2011 |
| KR | 20090122558 A | 12/2009 |
| KR | 20130021992 A | 3/2013 |
| KR | 20130033834 A | 4/2013 |
| WO | 2014109690 A1 | 7/2014 |

* cited by examiner

U-TURN ASSISTANCE

CROSS-REFERENCE TO RELATED APPLICATIONS

This application is the U.S. national phase of PCT Application. No. PCT/US2015/064746 filed on Dec. 19, 2015, the disclosure of which is hereby incorporated in its entirety by reference herein.

TECHNICAL FIELD

The present disclosure generally relates to traffic safety and, more particularly, to methods and systems for U-turn assistance.

BACKGROUND

A vehicle may not be able to turn completely around in a given area when an object, such as a boat, another vehicle, a trailer or a towable object, is attached to or otherwise towed by the vehicle. For a first time user of a particular vehicle, it may take time for the user to become familiar with the size and safe maneuvering, such as turning, of the vehicle. The attached object may be several hundred pounds and several meters long, and the vehicle may need to be maneuvered differently than when no object is attached to or towed by the vehicle, especially for certain maneuvers such as a circular turning and stopping. However, a driver might not be aware of these problems when operating the vehicle particularly for a first time user of the vehicle.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Implementations herein relate to U-turn assistance. A mobile device may collect vehicle data and calculate a turning radius based on the vehicle data. In some implementations, multiple attachable sensors may be used to collect the vehicle data for calculation of the turning radius. The mobile device may apply the turning radius for validation of turning capabilities of the vehicle. For example, a user of the vehicle may customize which parts of the vehicle are to be measured and adjust sensor data outputs to include additional features of the vehicle by using the attachable sensors.

Figure 1:
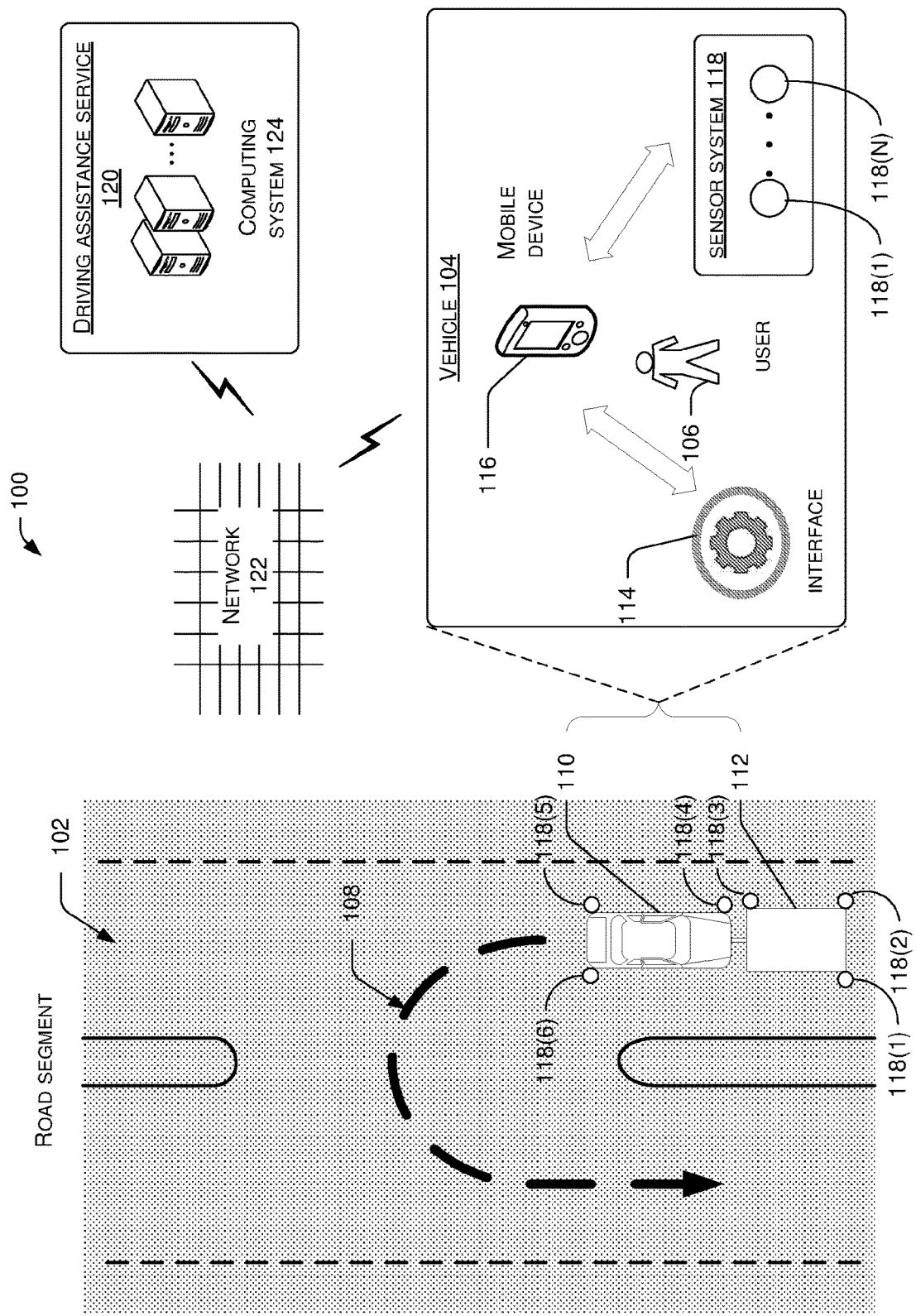
FIG. 1 is a diagram depicting an example environment in which example embodiments of the present disclosure may be implemented.

FIG. 1 illustrates an example environment 100 in which example embodiments of the present disclosure may be implemented. Environment 100 includes a road segment 102 and a vehicle 104 that is operated by a user 106 to perform a U-turn 108. Vehicle 104 herein refers to a combination of a towing vehicle 110 and a towed vehicle 112. Towed vehicle 112 may be, for example, a boat, another vehicle, a trailer or a towable object, and generally is not powered and towed by a towing vehicle 110 which is a powered vehicle.

Vehicle 104 may be equipped with an interface 114 that facilities driving assistance. In some implementations, interface 114 may enable a communication between the user 106 and a mobile device 116 without interrupting the operation of vehicle 104 by user 106. For example, interface 114 may be a vehicle accessory including a human interface device (e.g., a dashboard-mounted touch screen and/or one or more mechanical buttons) that is user-friendly and accessible to user 106. Mobile device 116 may be, for example, a smartphone, a smartwatch, a tablet computer, a laptop computer, a notebook computer, a personal digital assistant, a wearable device or the like. In some implementations, mobile device 116 may be incorporated into at least one of a vehicle navigation system, a vehicle infotainment system, or a GPS system. In these instances, certain functions of the mobile device 116 may be implemented by one or more of the vehicle navigation system, the vehicle infotainment system, and the GPS system associated with vehicle 104.

In some implementations, interface 114 may be placed within reach of user 106 such that user 106 may easily assess interface 114 to initialize driving assistance (e.g., U-turn assistance) when user 106 is operating vehicle 104. For example, one push of a button or touch on interface 114 may indicate that there is an attempted U-turn 108 at a specific location and, in some implementations, this may trigger or otherwise launch a driving assistance application installed on mobile device 116.

Either or both of mobile device 116 and interface 114 may collect vehicle information or data of vehicle 104 using a sensor system 118. Sensor system 118 may include multiple attachable sensors 118(1)-118(N), where N is a positive integer greater than 1, that may be placed on multiple locations of vehicle 104 (e.g., corners of vehicle 104). The attachable sensors 118(1)-118(N) may include one or more ultrasonic sensors, one or more capacitive sensors and/or one or more global positioning system (GPS) sensors with a certain attaching mechanism (e.g., magnet(s), adhesives or mounting/fastening fixture). Once the attachable sensors 118(1)-118(N) are positioned, a reader (e.g., interface 114 or mobile device 116) may receive signals from the attachable sensors 118(1)-118(N) via, for example, Bluetooth, infrared, Wi-Fi, Near Field Communication (NFC) or another suitable wireless communication technology. For illustrative purpose without limiting the scope of the present disclosure, in the example depicted in FIG. 1 a number of sensors (e.g., sensors 118(1)-118(6), are shown to be attached to various corners of towing vehicle 110 and towed vehicle 112. For instance, sensors 118(1), 118(2) and 118(3) may be attached to three corners of towed vehicle 112 for the measurement or determination of the width and length of towed vehicle 112. Moreover sensors 118(4), 118(5) and 118(6) may be attached to three corners of towing vehicle 110 for the measurement or determination of the width and length of towed vehicle 110. Of course, user 106 may utilize no more than two sensors to accomplish the same by attaching two sensors at two corners of towing vehicle 110 or towed vehicle 112 to measure or determine the length or width of towing vehicle 110 or towed vehicle 112 at a time.

In some implementations, user 106 may provide additional vehicle information or data to interface 114 and/or mobile device 116. For example, user 106 may provide a vehicle brand, a vehicle model, a manufacture year or any information or data pertaining to towing vehicle 110 and/or towed vehicle 112. In some implementations, user 106 may scan a vehicle identification number (VIN) of towing vehicle 110 and/or towed vehicle 112 using a scanning device which may be mobile device 116, and mobile device 116 may search a local or remote database to obtain additional vehicle information based on the scanned VIN. In some implementations, the additional vehicle information may include the maximum steer angle of the front wheel of towing vehicle 110, the wheelbase of vehicle 104, or both. In these instances, the wheelbase of vehicle 104 may be the distance between the front wheels of towing vehicle 110 and the rear wheels of towed vehicle 112.

Based on the collected vehicle information, mobile device 116 may calculate a turning radius of vehicle 104. The turning radius of vehicle 104 herein refers to a radius of a smallest circular turn that vehicle 104 is capable of making. For instance, the turning radius of U-turn 108 may refer to the smallest circular turn that vehicle 104 may make without hitting a street curb by a wheel of vehicle 104 or without scraping a wall or fixture around road segment 102 by vehicle 104. The turning radius of vehicle 104 may be calculated using a turning radius algorithm based on the vehicle information collected from sensor system 118 and, optionally, any additional vehicle information retrieved from the remote or local database. Based on the calculated turning radius, mobile device 116 may provide a recommendation for routing vehicle 104, e.g., from a current location to a destination, without vehicle 104 traveling through a location, area, or road segment that requires a U-turn not achievable by vehicle 104.

In some implementations, mobile device 116 may communicate with a driving assistance service 120 via a network 122. Network 122 may include wired and/or wireless networks that enable communications between the various computing devices described in environment 100. In some embodiments, network 122 may include local area networks (LANs), wide area networks (WAN), mobile telephone networks (MTNs), and other types of networks, possibly used in conjunction with one another, to facilitate communication between the various computing devices.

Driving assistance service 120 may include a set of related software and/or hardware components that may be reused for different purposes, and may function together with user-defined policies to provide driving assistance to user 106. In some implementations, driving assistance service 120 may include a computing system 124 (e.g., one or more servers) which may be configured to facilitate the driving assistance associated with mobile device 116. For example, computing system 124 may provide vehicle information of towing vehicle 110 and towed vehicle 112 to mobile device 116 in response to a request from mobile device 116 via network 122.

In some implementations, computing system 124 may calculate the turning radius of vehicle 104 based on the collected vehicle information from sensor system 118 (and, optionally, additional information retrieved from a database associated with or otherwise implemented in computing system 124 and/or a database associated with or otherwise implemented in mobile device 116). In these instances, computing system 124 may provide the turning radius, or a value thereof, to mobile device 116 and/or interface 114 to assist user 106 in the operation of vehicle 104 to perform U-turn 108.

Figure 2:
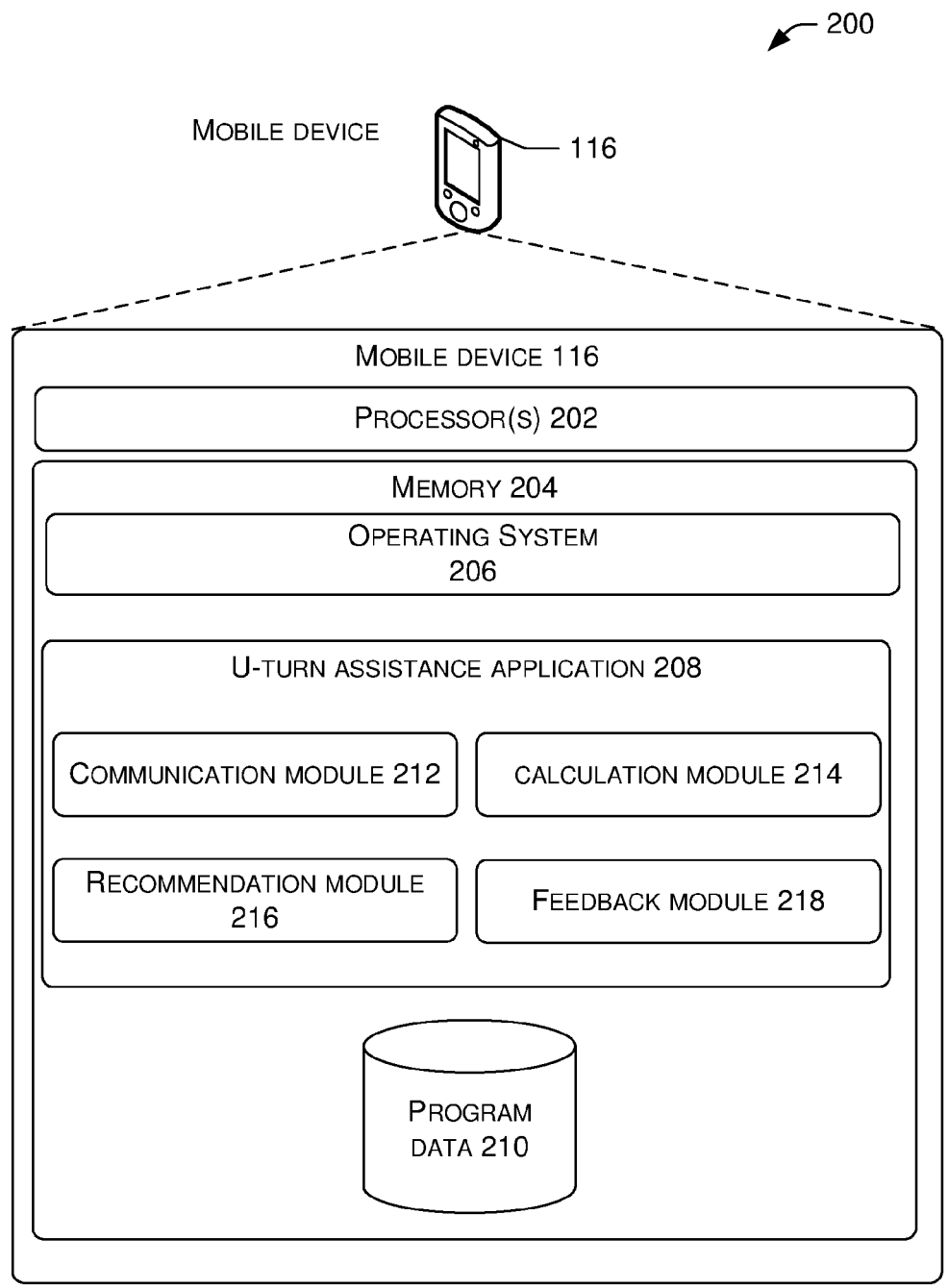
FIG. 2 is a block diagram depicting an example apparatus in accordance with an embodiment of the present disclosure.

FIG. 2 illustrates an example apparatus 200 in accordance with an embodiment of the present disclosure. Apparatus 200 may be an example implementation of mobile device 116 and, as depicted in FIG. 2, shows additional details of mobile device 116. Apparatus 200 may include at least those components shown in FIG. 2 as well as other components not shown, which may include additional modules, kernels, data, and/or hardware.

Apparatus 200 may include processor(s) 202 and memory 204. Memory 204 may store various modules, applications, programs, or other data, including one or more sets of instructions that, when executed by processor(s) 202, cause processor(s) 202 to perform the operations described herein pertaining to U-turn assistance. Processor(s) 202 may include one or more central processing units (CPU), one or more graphics processing units (GPU) and one or more application-specific integrated circuits (ASIC).

Apparatus 200 may include additional data storage devices (removable and/or non-removable) including one or more computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. A system memory, a removable storage and a non-removable storage may be examples of computer storage media. Computer storage media may include, but is not limited to, random-access memory (RAM), read-only memory (ROM), electrically erasable programmable read-only memory (EEPROM), flash memory or other memory technology, compact disc (CD)-ROM, digital versatile disks (DVD), or other optical storage, magnetic cassettes, magnetic tape, magnetic disk storage or other magnetic storage devices, or any other medium that can be used to store the desired information and which can be accessed by apparatus 200. Any such computer storage media may be part of apparatus 200. Moreover, the computer-readable media may include computer-executable instructions that, when executed by processor(s) 202, perform various functions and/or operations described herein.

In some implementations as shown in FIG. 2, memory 204 may store an operating system 206, a U-turn assistance application 208 and program data 210. The U-turn assistance application 208 may include various modules such as a communication module 212, a calculation module 214, a recommendation module 216, and a feedback module 218.

Communication module 212 may be configured to receive vehicle information of vehicle 104 from sensor system 118 that are placed on multiple locations of vehicle 104. Based on the vehicle information from sensor system 1108, apparatus 200 may obtain, calculate, compute or otherwise determine a length and a width of vehicle 104. In some implementations, the multiple sensors 118(1)-118(N) may be temporarily attached to towed vehicle 112 and/or towing vehicle 110 in order for apparatus 200 may collect vehicle information of towed vehicle 112 and/or towing vehicle 110.

In some implementations, apparatus 200 may receive, from user 106, an input including additional vehicle information of vehicle 104. For example, the additional vehicle information of vehicle 104 relates to vehicle data of towing vehicle 110 and/or a hitch system between towing vehicle 110 and towed vehicle 112. The additional vehicle information may be stored in a database which may be local and/or remote. For example, the database may be locally stored in apparatus 200. Alternatively or additionally, the database may be maintained by computing system 124. Based on the additional vehicle information, apparatus 200 may obtain a length and a width of towing vehicle 110. Accordingly, apparatus 200 may obtain, calculate, compute or otherwise determine the length and the width of vehicle 104 based on the length and the width of towing vehicle 110, the length and the width of towed vehicle 112, and the length of the hitch system.

In some implementations, apparatus 200 may receive, from interface 114, a driving assistance request associated with U-turn 108. In these instances, apparatus 200 may collect geographic information of a geographic location using a GPS function of apparatus 200. Geographic information herein refers to vehicle information and behavior that are relate to a geographic location of vehicle 104. Geographic location herein refers to either a relative location (e.g., San Francisco or 500 Sea World Drive, San Diego, Calif. 92109) as a displacement for another site or an absolute location using a coordinate system (e.g., a spherical coordinate system or a world geodetic system).

Calculation module 214 may be configured to calculate a turning radius of the vehicle. In some implementations, calculation module 214 may apply the vehicle information to calculate the turning radius of vehicle 104 using a turning radius algorithm. In these instances, calculation module 214 may further determine a feasibility of U-turn 108 in a predetermined range of road segment 102 using the U-turn algorithm. The feasibility may be determined based on the geographic information and the calculated turning radius of vehicle 104. The feasibility of U-turn 108 may indicate how likely vehicle 104 is capable of making U-turn 108 at a current location (e.g., likely safe or not safe) or one or more other locations such as, for example, various locations along a path between the current location and a destination.

Recommendation module 216 may be configured to provide a recommendation for routing vehicle 104 based at least in part on the turning radius. In some implementations, recommendation module 216 may provide the recommendation based on the turning radius of vehicle 104. For example, if the turning radius is over a threshold value, recommendation module 216 may cause U-turn assistance application 208 to warn user 106 before user 106 operates vehicle 104 to make U-turn 108. Alternatively or additionally, recommendation module 216 may cause U-turn assistance application 208 to direct user 106 on a route that requires no U-turns. For instance, apparatus 200 may provide visual and/or audible information (e.g., graphics, video, texts, sounds and/or synthesized or recorded voice) to warn and/or guide user 106.

In some implementations, recommendation module 216 may provide the recommendation based on the feasibility of U-turn 108. For example, if the feasibility indicates "likely safe" at the current geographic location, recommendation module 216 may assist user 106 to perform U-turn 108 accordingly. In some implementations, recommendation module 216 may additionally provide a route to user 106 if the feasibility indicates "not safe" at the current geographic location or another location. For example, recommendation module 216 may provide a route that requires no U-turns or one or more feasible U-turns at one or more geographic locations along the route.

Feedback module 218 may be configured to receive user feedback, e.g., from user 106 via interface 114, after U-turn 108 occurs. In these instances, the user feedback may include choices that user 106 has made with respect to opinions on U-turn maneuvers (e.g., successfully, partially successfully, or unsuccessfully). In some implementations, apparatus 200 may then associate or otherwise correlate the geographic information with the vehicle information of vehicle 104 and the user feedback, and store the association at a local or remote database. In some implementations, apparatus 200 may facilitate modification of the routing algorithm based on the user feedback. For example, a route determined by the routing algorithm may be modified based on the user feedback. This may be useful especially in cases where there are real-time road conditions not taking into account by the routing algorithm.

Figure 3:
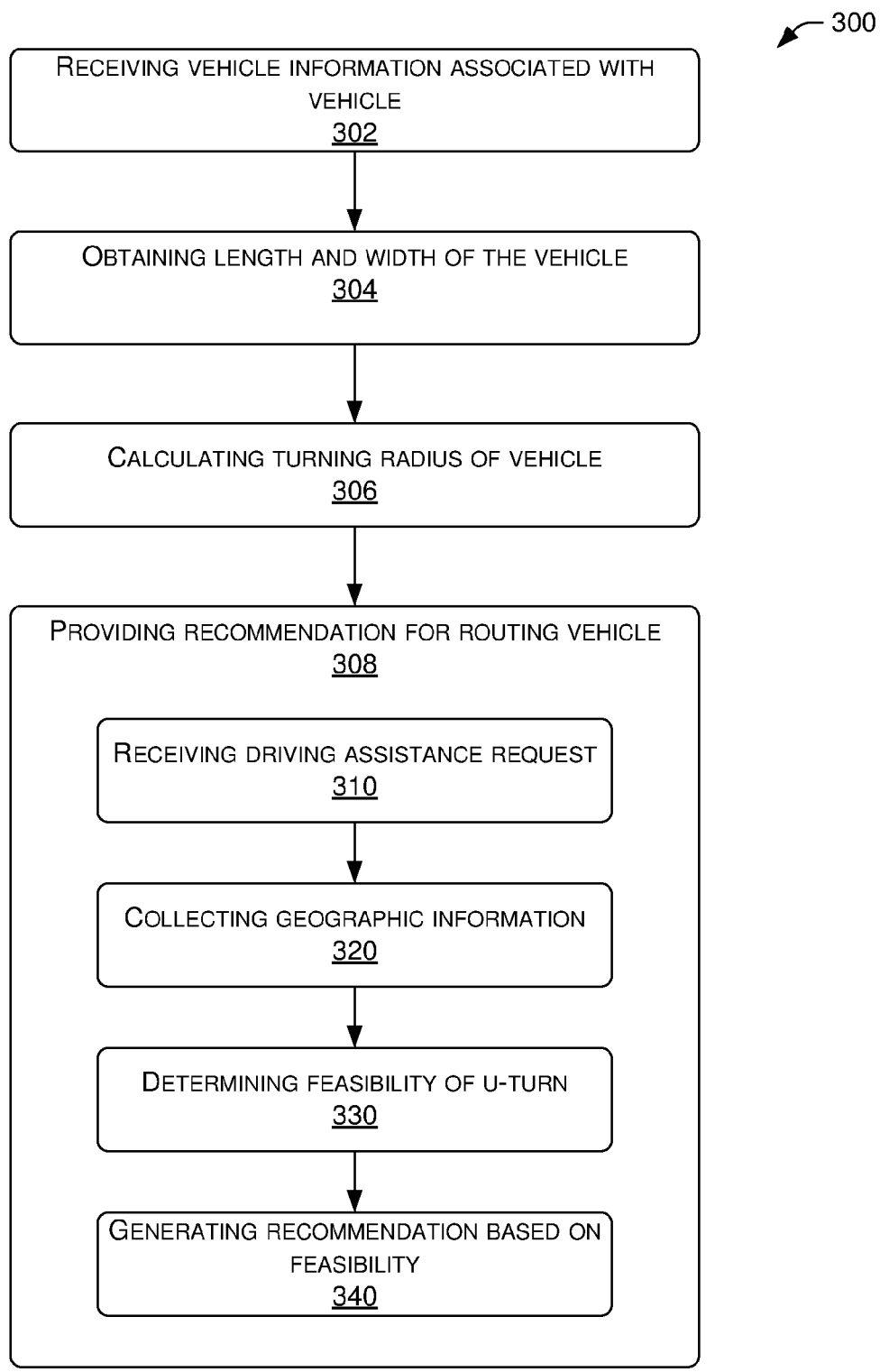
FIG. 3 is a flowchart of an example process in accordance with an embodiment of the present disclosure.

FIG. 3 illustrates an example process 300 in accordance with an embodiment of the present disclosure. Process 300 may include one or more operations, actions, or functions shown as blocks such as 302, 304, 306 and 308 as well as sub-blocks 310, 320, 330 and 340 encompassed in 308. Although illustrated as discrete blocks, various blocks of process 300 may be divided into additional blocks, combined into fewer blocks, or eliminated, depending on the desired implementation. Process 300 may be implemented by mobile device 116 in example environment 100 and by apparatus 200. For simplicity of description and not limiting the scope of the present disclosure, process 300 is described below in the context of apparatus 200 as an example implementation of mobile device 116. Process 300 may begin with block 302.

At 302, processor(s) 302 may receive vehicle information associated with vehicle 104 from sensor system 118. Sensor system 118 may include multiple sensors 118(1)-118(N) that may be temporarily placed on multiple locations of vehicle 104 such as, for example, multiple corners of vehicle 104. In some implementations, the multiple sensors 118(1)-118(N) may be placed on multiple locations of towed vehicle 112, and processor(s) 202 may receive vehicle information of towed vehicle 112.

At 304, processor(s) 202 may obtain a length and a width of vehicle 104 based on the received vehicle information. In some implementations, processor(s) 202 may receive a selection including information of towing vehicle 110 from user 106. For example, user 106 may provide the VIN of towing vehicle 110 to apparatus 200, and apparatus 200 may then search a local and/or remote vehicle database to obtain a length and a width of towing vehicle 110. Processor(s) 202 may then obtain the length and the width of vehicle 104 based at least in part on the length and the width of towing vehicle 110 and the received vehicle information of towed vehicle 112.

At 306, processor(s) 202 may calculate a turning radius of vehicle 104. In some implementations, the turning radius of vehicle 104 may be calculated using a turning radius algorithm based on the vehicle information of vehicle 104. In some implementations, the vehicle information of vehicle 104 may include the length and the width of towing vehicle 110 and towed vehicle 112 as well as the length of a hitch system between towing vehicle 110 and towed vehicle 112. In some implementations, the vehicle information may further include the maximum steer angle of the front wheel of towing vehicle 110, and the wheelbase of vehicle 104. In these instances, the wheelbase of vehicle 104 is the distance between the front wheels of towing vehicle 110 and the rear wheels or the wheels of towed vehicle 112.

At 308, processor(s) 202 may provide a recommendation for routing vehicle 104 based at least in part on the turning radius. In providing recommendations for routing vehicle 104, process 300 may involve a number of operations including 310, 320, 330, and 340.

At 310, processor(s) 202 may receive, from interface 114, a driving assistance request associated with U-turn 108. In some implementations, interface 114 may include a human interface device installed on a dashboard or a steering wheel of vehicle 104, and interface 114 may facilitate a communication between apparatus 200 and user 106.

At 320, processor(s) 202 may collect geographic information of a geographic location using a GPS function of apparatus 200.

At 330, processor(s) 202 may determine a feasibility of the U-turn in a predetermined range of the geographic location using a U-turn algorithm based on the geographic information and the calculated turning radius of vehicle 104. In some implementations, processor(s) 202 may determine an additional geographic location for U-turn 108 in response to a determination that the feasibility of U-turn 108 is less than a predetermined value. In these instances, apparatus 200 may then provide the additional geographic location to user 106.

At 340, processor(s) 202 may generate the recommendation based on the feasibility of U-turn 108. In some implementations, processor(s) 202 may receive user feedback from interface 114 after U-turn 108 occurs. Processor(s) 202 may then associate the geographic information with the vehicle information and the user feedback and store the association at a local or remote database.

In some implementations, processor(s) 202 may receive geographic information of a destination and geographic information of a current location of the vehicle, and then determine a route using a routing algorithm based on the turning radius of vehicle 104 and route information provided by user 106. The route information may include a destination and the current location of vehicle 104. Processor(s) 202 may then determine another route that requires no U-turns using a routing algorithm and provide information related to the other route to user 106. In these instances, processor(s) 202 may receive user feedback after vehicle 104 arrives the destination, and modify the routing algorithm based on the user feedback.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
receiving, at a mobile device, vehicle information associated with a vehicle from a plurality of sensors that are placed on a plurality of locations of the vehicle;
obtaining a length and a width of the vehicle based on the received vehicle information;
calculating a turning radius of the vehicle; and
providing a recommendation for routing the vehicle based at least in part on the turning radius, the recommendation including a U-turn event along a route if the U-turn event is feasible for the vehicle and not including the U-turn event along the route otherwise, the providing including
receiving, from an interface, a driving assistance request associated with the U-turn event,
collecting geographic information of a geographic location using a Global Positioning System (GPS) function of the mobile device,
determining a feasibility of the U-turn in a predetermined range of the geographic location using a U-turn algorithm based on the geographic information and the calculated turning radius of the vehicle, the feasibility specifying a likelihood of the vehicle being capable of making the U-turn at the geographic location, and
generating the recommendation to include the U-turn event or not include the U-turn event based on whether or not the feasibility of the U-turn indicates that the U-turn is feasible.

2. The method of claim 1, wherein the vehicle includes a towing vehicle and a towed vehicle, and the receiving of the vehicle information associated with the vehicle includes receiving vehicle information of the towed vehicle.

3. The method of claim 2, wherein the plurality of sensors includes a plurality of sensors that are temporarily attached to the towed vehicle.

4. The method of claim 2, wherein the obtaining of the length and the width of the vehicle based on the received vehicle information comprises:
receiving, from a user, a selection including information of the towing vehicle;
obtaining a length and a width of the towing vehicle from a vehicle database; and
obtaining the length and the width of the vehicle based on the length and the width of the towing vehicle and the received vehicle information of the towed vehicle.

5. The method of claim 1, wherein the interface comprises a human interface device installed on a dashboard or a steering wheel of the vehicle, and wherein the interface facilitates a communication between the mobile device and a driver of the vehicle.

6. The method of claim 1, further comprising:
providing an additional geographic location for the U-turn in response to a determination that the feasibility of the U-turn event is less than a predetermined value.

7. The Method of claim 1, further comprising:
receiving user feedback from the interface after the U-turn event occurs;
associating the geographic information with the vehicle information and the user feedback; and
storing the geographic information and the vehicle information.

8. The method of claim 1, further comprising:
receiving geographic information of a destination and geographic information of a current location of the vehicle;
determining a route using a routing algorithm based on the turning radius of the vehicle and the geographic information of the destination and the geographic information of the current location of the vehicle; and
providing information related to the route to a driver of the vehicle.

9. The method of claim 8, further comprising:
receiving user feedback after the vehicle arrives the destination; and
modifying the routing algorithm based on the user feedback.

10. A system comprising:
one or more processors; and
memory to maintain a plurality of components executable by the one or more processors, the plurality of components comprising:
a communication module configured to:
receive vehicle information associated with a vehicle from a plurality of sensors that are placed on a plurality of locations of the vehicle, and
obtain a length and a width of the vehicle based on the received vehicle information,
a calculation module configured to calculating a turning radius of the vehicle, and
a recommendation module configured to provide a recommendation for routing the vehicle based at least in part on the turning radius, the recommendation including a U-turn event along a route if the U-turn event is feasible for the vehicle and not including the U-turn event along the route otherwise, the operation to provide including to
receive, from an interface, a driving assistance request associated with the U-turn event,
collect geographic information of a geographic location using a Global Positioning System (GPS) function of the mobile device,
determine a feasibility of the U-turn in a predetermined range of the geographic location using a U-turn algorithm based on the geographic information and the calculated turning radius of the vehicle, the feasibility specifying a likelihood of the vehicle being capable of making the U-turn at the geographic location, and
generate the recommendation to include the U-turn event or not include the U-turn event based on whether or not the feasibility of the U-turn indicates that the U-turn is feasible.

11. The system of claim 10, wherein the vehicle comprises a towing, vehicle and a towed vehicle, and wherein the receiving of the vehicle information associated with the vehicle comprises receiving vehicle information of the towed vehicle, and wherein the plurality of sensors comprise a plurality of sensors that are temporarily attached to the towed vehicle.

12. The system of claim 11, wherein the communication module is further configured to:
receive, from a user, a selection including information of the towing vehicle;
obtain a length and a width of the towing vehicle from a vehicle database; and
obtain the length and the width of the vehicle based on the length and the width of the towing vehicle and the received vehicle information of the towed vehicle.

13. The system of claim 10, wherein the communication module is configured to receive geographic information of a destination and geographic information of a current location of the vehicle, wherein the calculation module is further configured to determine a route using a routing algorithm based on the turning radius of the vehicle and the geographic information of the destination and the geographic information of the current location of the vehicle, and wherein the recommendation module is further configured to provide information related to the route to a driver of the vehicle.

14. The system of claim 13, wherein the plurality of components further comprise a feedback module configured to:
receive user feedback after the vehicle arrives the destination; and
modify the muting algorithm based on the user feedback.

15. One or more computer-readable media comprising computer-executable instructions that, when executed on one or more processors, causes the one or more processors to:
receive, at a mobile device, vehicle information associated with a vehicle from a plurality of sensors, the vehicle comprising a towing vehicle and a towed vehicle, the plurality of sensors placed on a plurality of locations of the towed vehicle;
obtain a length and a width of the vehicle based on the received vehicle information;
calculate a turning radius of the vehicle; and
provide a recommendation for routing the vehicle based at least in part on the turning radius, the recommendation including a U-turn event along a route if the U-turn event is feasible for the vehicle and not including the U-turn event along the route otherwise, the operation to provide including to receive, from an interface, a driving assistance request associated with the U-turn event, collect geographic information of a geographic location using a Global Positioning System (GPS) function of the mobile device, determine a feasibility of the U-turn in a predetermined range of the geographic location using a U-turn algorithm based on the geographic information and the calculated turning radius of the vehicle, the feasibility specifying a likelihood of the vehicle being capable of making the U-turn at the geographic location, and generate the recommendation to include the U-turn event or not include the U-turn event based on whether or not the feasibility of the U-turn indicates that the U-turn is feasible.

16. The one or more computer-readable media of claim 15, wherein the plurality of sensors include a plurality of sensors that are temporarily attached to the towed vehicle.

17. The one or more computer-readable media of claim 15, wherein the computer-executable instructions further comprise instructions that, when executed on the one or more processors, causes the one or more processors to:

receive, from a user, a selection including information of the towing vehicle;

obtain a length and a width of the towing vehicle from a vehicle database; and obtain the length and the width of the vehicle based on the length and the width of the towing vehicle and the received vehicle information of the towed vehicle.

18. The one or more computer-readable media of claim 17, wherein the computer-executable instructions further comprise instructions that, when executed on the one or more processors, causes the one or more processors to:

receive user feedback from the interface after the U-turn event occurs;

associate the geographic information with the vehicle information and the user feedback; and store the geographic information and the vehicle information.

* * * * *